United States Patent [19]
Salam

[11] 3,948,566
[45] Apr. 6, 1976

[54] TRAILER BRAKE SYSTEM

[75] Inventor: William T. Salam, Highland Park, Ill.

[73] Assignee: Stromberg-Hydramite Corporation, Chicago, Ill.

[22] Filed: June 3, 1974

[21] Appl. No.: 475,828

[52] U.S. Cl. .................................. 303/7; 188/112
[51] Int. Cl.² ......................................... B60T 3/14
[58] Field of Search ...... 60/555, 556; 188/3 H, 112, 188/170; 303/7, 9, 31

[56] References Cited
UNITED STATES PATENTS

| | | | |
|---|---|---|---|
| 2,703,631 | 3/1953 | Hupp | 303/7 |
| 3,078,678 | 2/1963 | Beatty | 60/555 |
| 3,137,369 | 6/1964 | Stromberg | 188/112 |
| 3,200,579 | 8/1965 | Thirion | 60/555 X |
| 3,695,731 | 10/1972 | England et al. | 188/3 H X |

*Primary Examiner*—Duane A. Reger
*Attorney, Agent, or Firm*—James G. Staples

[57] ABSTRACT

A unitary braking system for a towing vehicle and a towed vehicle in which a pneumatic pressure force is added to the towing vehicle's master cylinder generated pressure force for applying the towed vehicle brakes during normal operation, and, upon loss of pressure in the master cylinder brake system due to unintended separation of the towing vehicle and towed vehicle the towed vehicle brakes are automatically applied by a spring controlled or other preloaded mechanical force applied to the towed vehicle's brake system.

1 Claim, 2 Drawing Figures

TRAILER BRAKE SYSTEM

This invention relates to braking systems for towed vehicles in which operation of the braking system on the towing vehicle also operates a brake system on the towed vehicle.

SUMMARY OF THE INVENTION

A need exists today for an effective hydraulic trailer brake system for trailers of a gross vehicle weight of about 1½ tons to about 12 tons. Recreation vehicles are a common example, although any trailer in roughly the above weight classification is a potential application.

Specifically, such hydraulic braking systems should be characterized by use of a minimum amount of master cylinder brake fluid displacement, the largest possible towed vehicle brake system fluid displacement from a given master cylinder displacement, smooth continuous modulation, powerful braking which is synchronized between the towing and towed vehicle, fade resistance, automatic break-a-way protection, anti-jackknife protection, and compliance with all Federal and State regulations. Prefably such a system should be applicable to disc brake systems, and be useable on both fifth wheel and conventional trailers. If possible, reserve tanks, which increase the cost and complexity of the system, should be avoided.

The invention accomplishes all of the foregoing objects by use of a hydraulic over mechanical over hydraulic coupler with coples the braking systems of the towing and towed vehicles, with the coupler output being fed into a vacuum over hydraulic power magnification system associated with the towed vehicle's brake system, which brake system may be a power brake system. The result is, in effect, a unitary system in which master cylinder foot pedal generated power is simultaneously applied to both the towing and towed brake systems, with the pressure applied to the towed vehicle brake system being equal to or greater than the pressure in the towing vehicle brake system. By suitable proportioning of parts the system can be so arranged that master cylinder foot pedal force applied in the towing vehicle alone will actuate the towing vehicle brake system and the towed vehicle brake system in synchronism.

Accordingly, the object of the invention is to provide a combined towing vehicle and towed vehicle braking system especially adapted to what might be described as intermediate weight trailer systems which possesses the above mentioned advantages. It should be understood however that the braking system of this invention is extremely flexible and, depending on specific system requirements, or the desire of the propriator, a specific application may include less than all of the above mentioned advantages. However, the invention invariably results in an equal or increased braking pressure in the towed vehicle system as contrasted to the towing vehicle system, smooth continuous modulation, powerful synchronized braking after conventional adjustment, automatic break-a-way safety control, and increased brake fluid displacement as contrasted to existing systems.

It is also important to note that the system hereafter described permits utilization of the minimum amount of available displacement from the towing vehicle brake system. Further, the illustrated power magnification device permits the obtaining of high pressure in the towed vehicle brake system concomitantly with a relatively low draw of master cylinder brake fluid.

Other objects and advantages of the invention will become apparent from reading the following description.

BRIEF DESCRIPTION OF DRAWING

The invention is illustrated more or less diagramatically in the accompanying drawing wherein.

DETAILED DESCRIPTION OF THE INVENTION

Figure 1:
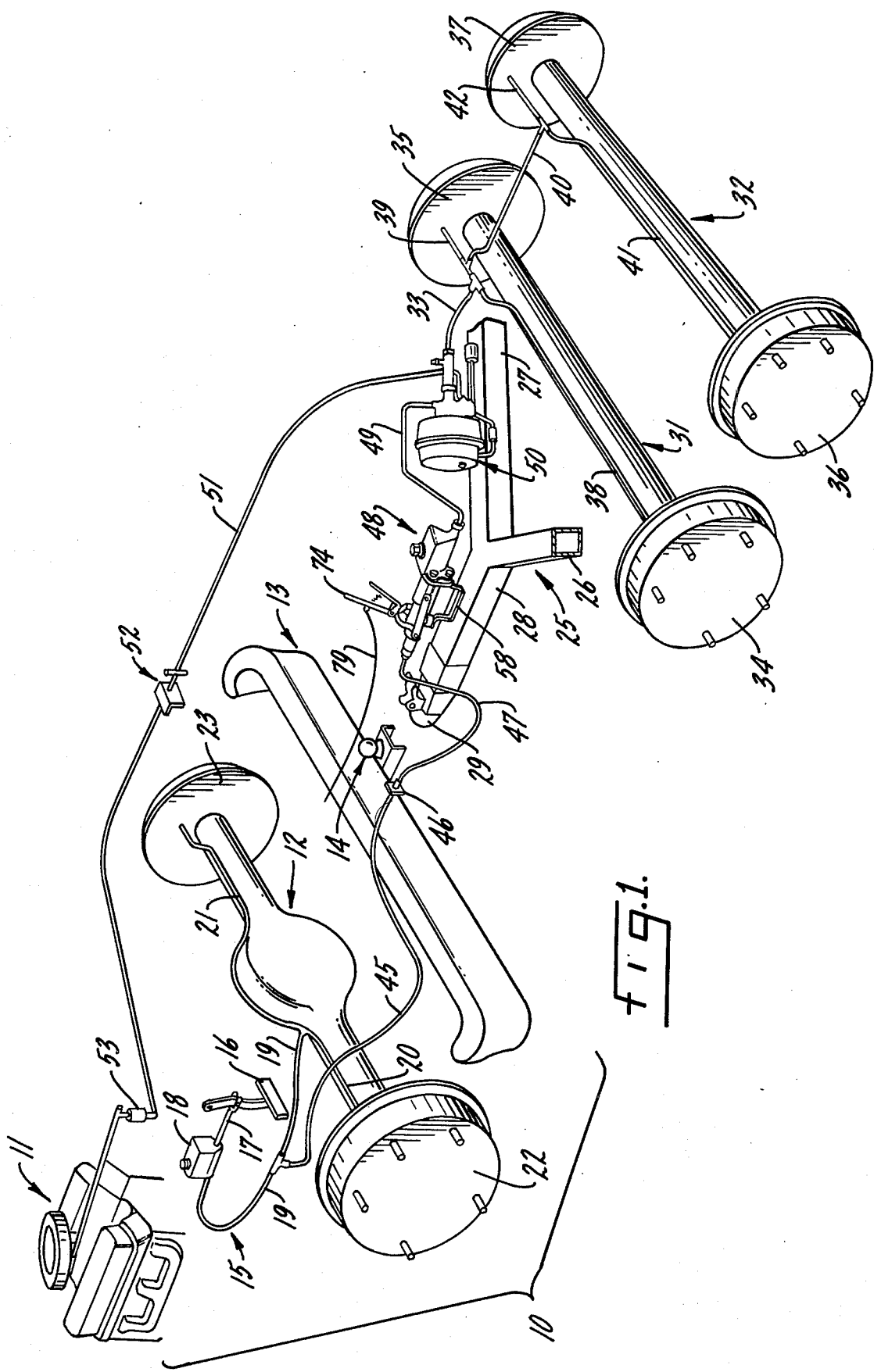
FIG. 1 is a partial, perspective view of a braking system for a towing vehicle and a towed vehicle embodying the present invention.

Like reference numerals will be used to refer to like parts from Figure to Figure in the drawing.

The essential features of a tractor-trailer system, usually hereafter referred to as a towing vehicle/towed vehicle system, are illustrated in FIG. 1. The illustrated components of the towing vehicle 10 include the engine 11, one of two or more axle assemblies 12, the rear bumper 13 of the vehicle frame, and the ball portion 14 of a ball and socket hitch assembly.

The towing vehicle's hydraulic braking system, indicated generally at 15, includes the conventional foot pedal 16 in the operators compartment, which foot pedal is mechanically linked as at 17 to a conventional master cylinder 18. In this instance a conventional single cylinder master cylinder has been illustrated; however the invention is equally applicable to a tandem master cylinder system. Likewise a conventional or a power brake system may be used with the present invention. A hydraulic pressure conduit 19 connects the master cylinder 18 to individual wheel brake lines 20, 21. Lines 20, 21 in turn are each connected to a hydraulic brake associated with each of wheels 22, 23. Since the construction of the wheels, the wheel brakes and the piping and valving in the master cylinder may be conventional, and does not, by itself, comprise an essential feature of the invention, it is not specifically described.

The forward end of the frame of the towed vehicle is indicated generally at 25, the frame including left and right side frame members 26, 27 respectively, and tongue 28 on which the socket half 29 is mounted.

A pair of axle assemblies are indicated generally at 31, 32. The towed vehicle hydraulic fluid pressure system includes a main conduit 33 which admits and exhausts pressure fluid to and from the brakes associated with each of wheels 34 – 37 inclusive via conventional pressure lines 38 – 42 inclusive.

The braking system of this invention includes a pressure line 45 which is tapped into the conventional hydraulic pressure conduit 19 connecting the master cylinder to the towing vehicle brakes, pressure line 45 terminating, preferably, at a mounting bracket 46 on rear frame member 13. A flexible conduit 47 is connected to the end of pressure line 45 at its upstream end, and to a coupling unit 48 at its downstream end. The coupling unit 48 in turn is connected by pressure line 49 to a power magnification device 50 which in turn has its outlet port connected to main conduit 33. A pneumatic line 51 is connected, at its inlet end, to the engine manifold, and, at its outlet end, to the power magnification device. A connect-disconnect device is indicated at 52 and a check valve at 53 whose purpose will be explained hereinafter. Alternately, or in addition, a check value may be located in or near the pneumatic line inlet to the power magnification device 50.

Figure 2:
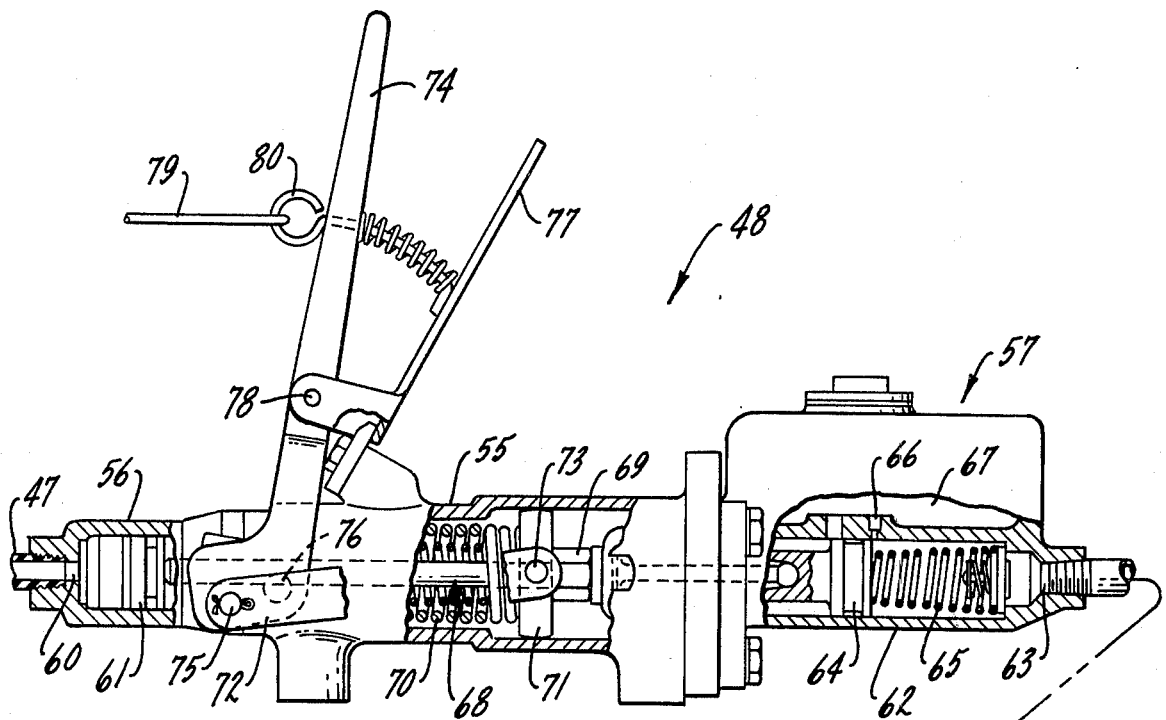
FIG. 2 is a side elevation to a larger scale with parts omitted or broken away for clarity of the combined coupler/power mangification feature of the system.
Figure 2:
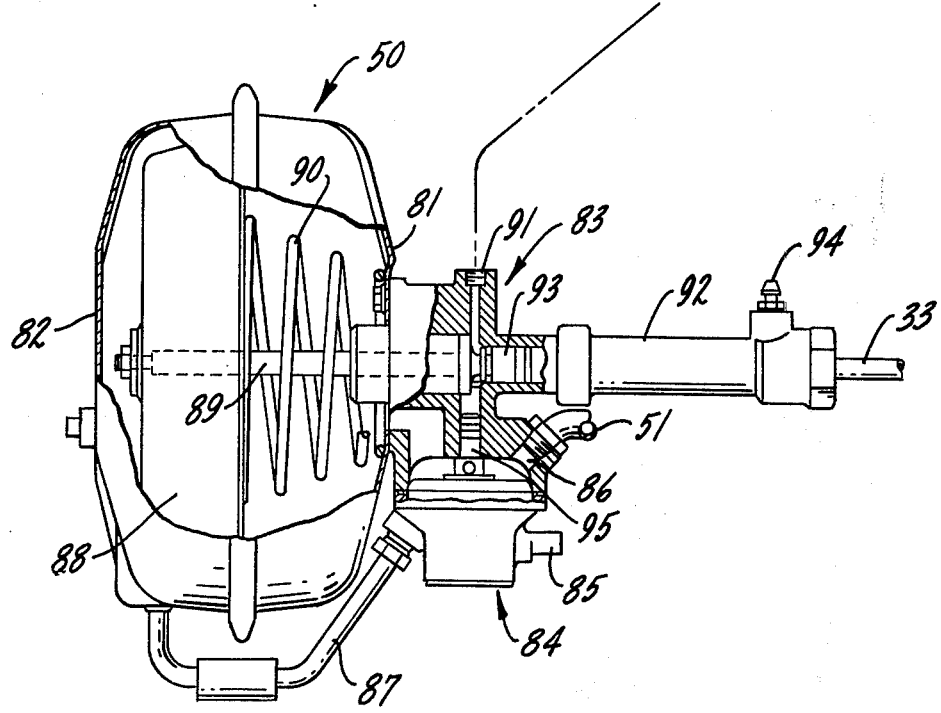

Referring now to FIG. 2, the coupling unit 48 there shown includes a central housing 55 to which a slave cylinder 56 is connected at the forward end, and a combined slave cylinder-fluid pressure reservoir 57 at the other end. Preferably slave cylinder 56 is connectable and disconnectable as by a snap ring or other conventional connection means to the forward end of central housing 55. In any event, the slave cylinder 56 should be readily separable from central housing 55 by a modest tension force exterted on line 45, 47. The cylinder/reservoir 57 is preferably permanently bolted to central housing 55. The entire assembly is supported by a bracket 58 (see Fig. 1) which is bolted or otherwise suitably secured to tongue 28 in a position to present the coupling unit to the user at a convenient height.

Slave cylinder 56 comprises, in effect, a closed chamber having a hydraulic port 60 at one end and a moveable piston 61 at the opposite end.

The cylinder portion 62 of the cylinder/reservoir 57 forms a closed chamber having a port 63 at one end and a moveable piston 64 at the other end. A return spring 65 located between moveable piston 64 and the port end of the chamber is biased to urge piston 64 in a feftward direction as viewed in FIG. 2. A fluid makeup inlet 66 connects the closed chamber in cylinder 62 to the reservoir 67.

A push rod is indicated generally at 68 in the central housing 55. The left end of push rod 68 bears against the exterior face of left moveable piston 61, and the right end of push rod 68 bears against the left side of right moveable piston 64. The push rod 68 thereby provides a mechanical link between the hydraulic system which terminates at the left face of moveable piston 61, and the hydraulic system which terminates at the right face of moveable piston 64 since admission of high pressure hydraulic fluid to the closed chamber of slave cylinder 56 will move piston 61 to the right, and this movement in turn will be transmitted to push rod 68 which, in turn, will move piston 64 to the right against the bias of spring 65. Likewise, upon a drop in the pressure in slave cylinder 56, return spring 65 will urge piston 64, and thereby push rod 68, to the left which in turn will move piston 61 to the left.

An emergency brake applying spring is indicated at 70, the left end of the spring being bottomed against the left end of housing 55, and the right end being bottomed against a plate 71. Plate 71 has a central aperture, not shown, slightly larger than the outside diameter of push rod 68 so that during normal operation push rod 68 can freely reciprocate without engaging spring plate 71. A pair of links 72 connect spring plate 71, by pivot pin 73, to lever 74 via pivot pin 75. Lever 74 is preferably a yoke type lever in which the two terminal arms of the yoke are pivoted to the central housing 55 by a pair of external stub shafts, one of which is indicated at 76. A latch release lever is indicated at 77, said lever being pivotally connected to the emergency lever 74 at 78. A breakaway chain is indicated at 79, the chain being connected to eyelet 80 on a stub chain which is bolted or otherwise suitably secured to latch release lever 77, at one end, and passes through a suitable aperture in the emergency release lever 74 near the other end.

The power magnification system includes a vacuum power chamber front shell 81 which is clamped to a vacuum power chamber rear shell 82. The vacuum power chamber in turn is clamped to a hydraulic slave cylinder assembly 83 which includes a control valve 84 mounted on the lower side thereof. The control valve 84 includes an atmosphere port 85 and a vacuum port 86, the vacuum port being connected to pneumatic line 51. A control tube 87 connects the control valve 84 to the rear shell 82.

A power diaphragm is indicated at 88, said power diaphragm being connected to a push rod 89 which is received in an aperture in the left end of hydraulic slave cylinder assembly 83. A power diaphragm return spring 90 is biased to move the power diaphragm to the left when equal pressure exists on both sides of the power diaphragm.

The control valve assembly includes an inlet 91 for high pressure fluid, which inlet in connected to the chamber within hydraulic cylinder 92 through suitable apertures in piston 93. The main conduit 33 of a towing vehicle brake system is connected to the hydraulic outlet port at the right end of hydraulic cylinder 92. A bleed screw is indicated at 94.

The control valve assembly includes a control piston 95 which, depending upon its position within its cylinder, determines whether both sides of the power diaphram 88 are connected to vacuum, or whether only one side is connected to vacuum and the other side to the atmosphere.

The power amplification device and its mode of operation are now well known in the trade since said device is commercially available under the trademark HYDROVAC, and is described in the technical literature.

The use and operation are as follows.

To install the system, hydraulic pressure conduit 19 is altered by the addition of a Tee, and pressure line 45 and flexible conduit 47 are connected to the Tee. The outlet end of line 47 is connected to slave cylinder 56, the slave cylinder in turn being connectable and disconnectable at will from the coupling unit 48 which is mounted on tongue 28 of the vehicle. Port 63 of the cylinder/reservoir 57 is connected by pressure line 49 to the hydraulic inlet port 91 of the power magnification device. The outlet hydraulic port of the power magnification device is connected by main conduit 33 of the towing vehicle brake system. Vacuum port 86 of the power magnification device is connected by vacuum line 51 to the engine manifold through a check valve 53 whose function is to ensure the maintenance of a vacuum in line 51, and accordingly in power magnification device 50 in the event of a loss of vacuum in the engine manifold.

In normal operation the individual parts are positioned as shown in the Figures. When the operator depresses foot pedal 16 pressure is generated in hydraulic pressure conduit 19 which actuates the towing vehicle brakes associated with wheel 22 and 23 via branch pressure conduits 20, 21 respectively.

The pressure generated by the operator is also passed by lines 45 and 47 to the port 60 in slave cylinder 56. Admission of pressure fluid in the chamber to the left of piston 61 moves piston 61 to the right. Movement of piston 61 in turn pushes push rodd 68 to the right which in turn moves piston 64 to the right against the return bias of return spring 65. The hydraulic fluid in the chamber within cylinder 62 passes via pressure line 49 to the inlet port 91 of the power magnification device. Spring 68 and plate 71 are inoperative at this time.

At this point the pressure fluid supplied to the brakes associated with wheels 34 – 37 is magnified as follows.

Pressure fluid entering port 91 causes piston 93 to move to the right thereby creating a first increment of pressure in the chamber within cylinder 92 which results in a pressure in pressure line 33. Simultaneously, the pressure in line 49 depresses control piston 95 with the result that communication between the left side of power diaphram 88 and vacuum source 51 is cut off. Atmospheric pressure is thereby admitted to the left side of power diaphram 88 and push rod 89 is thereby moved to the right. Thus, the force from the differential pressure existing on either side of the power diaphram 88 is added to the hydraulic pressure from inlet line 49, with the result that the pressure in main conduit 33 is increased over the pressure in line 49.

When the brakes are released by the operator the pressure in slave cylinder 56 decays and consequently return spring 65 urges piston 61 to the left through the medium of moveable piston 64 and push rod 68. As piston 64 moves to the left the pressure in inlet line 49 decays. As the pressure drops in the interior of the hydraulic slave cylinder assembly, control piston 95 moves upwardly to its illustrated FIG. 2 position by means of a conventional return spring arrangement not herein shown. Movement of piston 95 cuts off communication between the atmosphere and the left side of power diaphram 88, and simultaneously reconnects the left side of power diaphragm 88 to vacuum line 51 through the control valve assembly 84. Power diaphram 88 thus returns to the illustrated FIG. 2 position and likewise 93 returns to the illustrated FIG. 2 position.

In the event of a loss of a exhaust pressure in the engine manifold, check valve 53 prevents the back flow of atmospheric air from the engine into the vacuum inlet port 86.

In the event of a separation of the ball and socket hitch while the towing vehicle and towed vehicle are moving over the road, the following will occur.

The breakaway chain 79 will be ruptured but this will not effect the brake system in the towing vehicle because pressure line 45, 47 is longer than breakaway chain 79, and slave cylinder 56 is separable from central housing 55 by a force considerably less than the force needed to sever line 45, 47. A check valve is preferably located in line 45 just downstream from the point were line 45 is tapped into main hydraulic pressure conduit 19. It will thus be apparent that control of the towed vehicle brakes by means of the operator foot pedal system is not lost when a breakway occurs.

As the vehicle separates breakaway chain 79 will pull latch release lever 77 in a counterclockwise direction around pivot pin 78 thereby releasing lever 77 from its illustrated latch position.

As soon as the latch is released spring 70 extends, thereby moving spring plate 71 to the right. Spring plate 71 strikes abutment 69 which is carried by push rod 68. As a result spring plate 71 will move push rod 68 to the right, thereby generating pressure in cylinder 62 which is transmitted via line 49, hydraulic cylinder 92 to main conduit 33 and thence to the individual wheel brake 34 – 37 via conduits 38 – 42. It will be understood the high pressure fluid will pass through suitable apertures, not illustrated, in piston 93. As a result the brakes on the towed vehicle will be applied, and maintained applied, so long as spring 70 is extended even though the slave cylinder has separated from the central housing and the breakaway chain 79 has been severed.

Although a preferred embodiment and several variations thereof have been illustrated and described it will be understood that other modifications and variations will be apparent to those skilled in the art.

For example, the ratio of the pressures in the towed and towing vehicle brake systems can be varied, if desired, by suitable proportioning of the diameters of pistons 61 and 64. Likewise, additional safety features can be incorporated without substantial rearrangement of parts, such as the use of a cable attached to lever 74 which extends to a mechanical brake lever on the trailer brakes. Such a cable would function to set the trailer brakes upon intentional separation of the brake systems, much like the parking brake system of an automobile. Further a hand control of the type sold under the trademark Hydramite 5900 may, if desired, be incorporated into the system.

Accordingly it is intended that the scope of the invention be limited solely by the scope of the hereafter appended claims when interpreted in the light of the pertinent prior art, and not by the scope of the foregoing exemplary description.

I claim:

1. In a braking system for a towing vehicle having a hydraulic brake system and a towed vehicle having a hydraulic system, the combination of
   a source of hydraulic pressure carried by the towing vehicle,
   a coupling unit carried by a towed vehicle for transmitting hydraulic pressure forces generated in the towing vehicle brake system to the towed vehicle brake system,
   said coupling unit including means for converting hydraulic pressure forces generated in the towing vehicle brake system into a mechanical force, and means for converting the aforesaid mechanical forces into a hydraulic pressure force in communication with the towed vehicle brakes by means of
   a hydraulic pressure port which opens into a closed chamber having a movable piston therein,
   a second closed chamber having a port which is connectable to said hydraulic pressure conduit means,
   said second closed chamber having a movable piston therein,
   mechanical link means extending between the aforesaid movable pistons and effective to generate pressure in the second closed chamber, and thereby the hydraulic pressure conduit means, in response to movement of the movable piston in the first closed chamber in a brake applying direction, and
   return means for returning the second movable piston and mechanical link means to a brake pressure release position upon release of the application of force to the first movable piston,
   a hydraulic pressure line connecting the source of hydraulic pressure to the coupling unit,
   hydraulic pressure conduit means extending from the coupling unit to the towed vehicle brakes,
   a pneumatic/hydraulic force generating unit in the hydraulic pressure conduit means between the coupling unit and towed vehicle brakes, said pneumatic/hydraulic force generating unit being carried by the towed vehicle and being located a fixed distance from the coupling unit,
said pneumatic/hydraulic unit being activated by pressure derived from the coupling unit,
said pneumatic/hydraulic unit being effective to increase the pressure applied to the towed vehicle brakes upon application to it of pressure from the source of hydraulic pressure carried by the towing vehicle, and
means for mechanically setting a towed vehicle brakes upon operation of the towed vehicle and the towing vehicle brake system in the event of failure of the hydraulic brake system.

* * * * *